United States Patent
Kocher et al.

(10) Patent No.: US 7,760,876 B2
(45) Date of Patent: Jul. 20, 2010

(54) CONTENT SECURITY LAYER PROVIDING LONG-TERM RENEWABLE SECURITY

(75) Inventors: Paul Carl Kocher, San Francisco, CA (US); Joshua Michael Jaffe, San Francisco, CA (US); Benjamin Che-Ming Jun, Oakland, CA (US); Matthew Thomas Carter, San Leandro, CA (US); Peter Kelley Pearson, Aptos, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 234 days.

(21) Appl. No.: 11/974,594

(22) Filed: Oct. 15, 2007

(65) Prior Publication Data

US 2008/0037781 A1    Feb. 14, 2008

Related U.S. Application Data

(63) Continuation of application No. 10/113,363, filed on Mar. 27, 2002, now abandoned.

(60) Provisional application No. 60/279,323, filed on Mar. 28, 2001.

(51) Int. Cl.
  *G06F 21/06* (2006.01)
  *H04L 9/18* (2006.01)
(52) U.S. Cl. .................. 380/202; 713/176; 725/34
(58) Field of Classification Search .......... 713/176; 380/200–203, 209–211, 234, 239–242; 726/17, 726/21; 725/25, 34; 705/56–58
See application file for complete search history.

(56) References Cited

U.S. PATENT DOCUMENTS 3,956,615 A    5/1976    Anderson et al.

(Continued)

FOREIGN PATENT DOCUMENTS

AU    199960042    4/2000

(Continued)

OTHER PUBLICATIONS

Ford, Susan, "Advanced Encryption Standard (AES) Questions and Answers," Oct. 2, 2000, pp. 1-5, obtained from http://www.nist.gov/public_affairs/refeases/aesq&a.htm.

(Continued)

*Primary Examiner*—Gilberto Barron, Jr.
*Assistant Examiner*—Venkat Perungavoor
(74) *Attorney, Agent, or Firm*—James H. Salter; Andy T. Pho

(57) ABSTRACT

In an exemplary embodiment, digital content is mastered as a combination of encrypted data and data processing operations that enable use in approved playback environments. Player devices having a processing environment compatible with the content's data processing operations are able to decrypt and play the content. Players can also provide content with basic functions, such as loading data from media, performing network communications, determining playback environment configuration, controlling decryption/playback, and/or performing cryptographic operations using the player's keys. These functions allow the content to implement and enforce its own security policies. If pirates compromise individual players or content titles, new content can be mastered with new security features that block the old attacks. A selective decryption capability can also be provided, enabling on-the-fly watermark insertion so that attacks can be traced back to a particular player. Features to enable migration from legacy formats are also provided.

23 Claims, 3 Drawing Sheets

U.S. PATENT DOCUMENTS

| | | | |
|---|---|---|---|
| 5,488,410 A * | 1/1996 | Lieberfarb et al. ............ 726/26 |
| 5,754,648 A | 5/1998 | Ryan et al. |
| 5,859,950 A | 1/1999 | Iwamoto |
| 5,915,018 A | 6/1999 | Aucsmith |
| 5,949,881 A | 9/1999 | Davis |
| 5,991,399 A | 11/1999 | Graunke et al. |
| 6,041,316 A | 3/2000 | Allen |
| 6,058,478 A | 5/2000 | Davis |
| 6,088,455 A * | 7/2000 | Logan et al. ................ 380/200 |
| 6,141,681 A | 10/2000 | Kyle |
| 6,164,853 A | 12/2000 | Foote |
| 6,170,060 B1 * | 1/2001 | Mott et al. ................... 726/29 |
| 6,182,215 B1 | 1/2001 | Tatebayashi et al. |
| 6,496,898 B1 | 12/2002 | Tsutsui |
| 6,529,950 B1 | 3/2003 | Lumelsky |
| 6,542,610 B2 | 4/2003 | Traw |
| 6,744,891 B1 | 6/2004 | Allen |
| 6,859,789 B1 | 2/2005 | Hayashi |
| 6,931,534 B1 | 8/2005 | Jandel et al. |
| 6,937,553 B1 | 8/2005 | Mitui |
| 6,999,587 B1 | 2/2006 | Asano |
| 7,065,216 B1 | 6/2006 | Benaloh |
| 2001/0051928 A1 | 12/2001 | Brody |
| 2001/0054144 A1 | 12/2001 | Epstein |
| 2001/0055391 A1 * | 12/2001 | Jacobs ........................ 380/241 |
| 2002/0035492 A1 | 3/2002 | Nonaka |
| 2008/0049935 A1 | 2/2008 | Kocher et al. |
| 2008/0072040 A1 | 3/2008 | Asano et al. |
| 2008/0130886 A1 | 6/2008 | Kocher et al. |

FOREIGN PATENT DOCUMENTS

| | | |
|---|---|---|
| EP | 0668695 | 8/1995 |
| EP | 982725 A2 | 1/2000 |
| EP | 0982725 A2 | 3/2000 |
| JP | 09-163339 | 6/1997 |
| JP | 09163339 | 6/1997 |
| JP | 11-088659 | 3/1999 |
| JP | 1188659 | 3/1999 |
| JP | 11169365 | 6/1999 |
| JP | 11-185383 | 7/1999 |
| JP | 11185383 | 7/1999 |
| JP | 11-232775 | 8/1999 |
| JP | 11232775 | 8/1999 |
| JP | 200090567 | 3/2000 |
| JP | 2000090567 | 3/2000 |
| JP | 2000163883 | 6/2000 |
| JP | 2000175188 | 6/2000 |
| JP | 2001006278 | 1/2001 |
| JP | 2001006278 A | 1/2001 |
| JP | 2001023297 | 1/2001 |

OTHER PUBLICATIONS

EP Search Report for EP08075213 (a counterpart to this case) and communication setting for examination, mailed Jun. 3, 2008—rel to references cited on previous page.

US Office Action mailed Feb. 25, 2008 in a sister case (corresp. To US Publ. 20040133794), rel to reference cited on previous page.

"U.S. Appl. No. 11/977,862, Non Final Office Action mailed Sep. 22, 2009", 12 pgs.

"U.S. Appl. No. 11/977,862, Response filed Jan. 05, 2010 to Non Final Office Action mailed Sep. 22, 2009", 13 pgs.

"U.S. Appl. No. 11/982,234, Non-Final Office Action mailed Oct. 08, 2009", 10 pgs.

"U.S. Appl. No. 11/982,234, Response filed Jan. 8, 2010 to Non Final Office Action mailed Oct, 8, 2009", 11 pgs.

Ford, Susan, "Advanced Encryption Standard (AES) Questions and Answers", [Online]. <URL: http://www.nist.gov/public_affairs/releases/aesq&a.htm>, (Oct. 2, 2000), 1-5.

* cited by examiner

CONTENT SECURITY LAYER PROVIDING LONG-TERM RENEWABLE SECURITY

CROSS-REFERENCE TO RELATED APPLICATION

This application is a continuation of U.S. application Ser. No. 10/113,363 filed Mar. 27, 2002 now abandoned, which claims the benefit of U.S. Provisional Application No. 60/279,323, filed Mar. 28, 2001.

FIELD

This application relates generally to securing the distribution of digital content against piracy and other unauthorized use or redistribution.

BACKGROUND

A wide variety of systems have been proposed for protecting digital content. Most such schemes encrypt the content to protect it against unauthorized use and copying while it is stored on media or sent over untrusted communication channels. Decryption algorithms and keys are then managed by trusted, tamper-resistant software or hardware modules, which are designed to enforce access control rules (which may be fixed or configurable) specifying how the content can be used.

Content protection schemes are generally customized for a particular playback environment. For example, anti-piracy systems in software-only streaming content players designed for personal computers lack the security benefits of tamper resistant hardware but can generally be upgraded without great difficulty (e.g., if the user uninstalls the player and downloads an updated version from the manufacturer web site). As a result, such systems may provide less robust security than hardware-based players, but the consequences of an attack are relatively small since upgraded security features can be deployed by modifying the content stream and requiring that users upgrade their software.

In contrast, protection methods embedded in consumer electronics hardware devices that play optical media are notoriously difficult to upgrade. Security challenges include the long lifetime of optical media (which prevents security upgrades that are not backward-compatible), the lack of a convenient and reliable way to deliver updates to players, and the lack of standardization between player implementations. These difficulties, combined with the long lifetime of playback devices and the consumer expectation that all new content will play on old players, make it extremely difficult to introduce security upgrades. As a consequence, most consumer electronics devices provide little or no real protection against copying, and the few content protection standards that are deployed in consumer electronics devices tend to be simple, rigid schemes that offer little flexibility and renewability. FIG. 1 diagrams a typical content protection system of the background art. Content player 100 includes software in nonvolatile program memory 105, which implements the player's security policies 110, decryption code 120, and player keys 130. This code and keys are used by processor 140 to validate whether the content read from media 150 is valid and, if so, to decrypt the content and supply the results to output interface 160. Examples of protection systems like the one shown in FIG. 1 include the copy control scheme used with digital audio tape, the content scrambling system (CSS) intended to protect DVD video, and the CPPM scheme proposed for protecting DVD audio.

A variety of different technologies are known in the background art:

Access control policies: A wide variety of access policies, and methods for specifying such policies, are known in the background art. For example, the software protection system of U.S. Pat. No. 4,658,093 to Hellman uses a straightforward authorization code issued by a publisher. In contrast, U.S. Pat. No. 5,982,891 to Ginter et al. describes a variety of very complex access rules involving a large number of participants. Standards for encoding access policies (both for use with content distribution and other applications) have also been proposed, such as PolicyMaker and the X.509 certificate format.

Anti-virus software: Methods for detecting and blocking known viruses, Trojan horses, and other malicious code are well known in the background art. These methods generally involve scanning for attributes of known viruses, such as known instruction sequences. These programs can work in a variety of ways, such as scanning files during start-up, scanning files on-the-fly, scanning programs as they execute, scanning memory, scanning new media, scanning network communications, etc.

Content protection systems and DRMs: A wide variety of content protection systems (which are also sometimes called Digital Rights Management (DRM) systems) have been proposed. DRM systems of the background art generally provide for content to be distributed in encrypted form, then supply decryption keys or perform decryption operations for legitimate purchasers. Many features have been proposed or included in commercial DRMs, including support for superdistribution (where encrypted content can be exchanged between users), pay-per-use billing (including off-line pay-per-use with reporting via a telephone line), variable billing rates (charging different amounts based on promotions, number or duration of uses, requested user operations, user history, etc.), protection for various data types (audio, video, text, software, etc.), support for various formats, and support for various playback device types (portable, set-top, computer-based with hardware assistance, software-only, etc.)

Copy protection: Methods for copy protecting personal computer software are known and are widely deployed for some kinds of software such as computer games. These methods often involve binding a software program to physical media that are designed to be difficult to copy (e.g., by intentionally incorporating errors or nonstandard formatting that are difficult to replicate). Other copy protection systems involve securing the installation process, e.g. by requiring that users obtain an authorization code from a server. In some cases, copy protection features are designed into a system. In others cases (including copy protection systems used for computer software, videocassette tapes, and audio CDs), copy protection is implemented by producing media with nonstandard encoding that allows playback on most players but will confuse most attempts to copy the media. A major design challenge for copy protection systems is to minimize the impact on legitimate users (i.e., obtain high playability and user acceptance) while preventing undesirable actions as effectively as possible (i.e., obtaining good security).

Cryptographic functions: A wide variety of basic cryptographic functions are known, including block ciphers, hash functions, digital signature systems (and other public key systems), key management systems, etc. For more information about basic cryptography, see *Applied Cryptography* by Bruce Schneier.

Cryptographic oracles: Using block ciphers or other cryptographic functions, it is possible to construct "cryptographic oracles" which apply a secret cryptographic transformation to arbitrary externally-supplied input messages and return the results. Cryptographic oracles can be constructed so that it is computationally infeasible for an attacker who knows the oracle's algorithms and protocols to determine the oracle's keys. In addition, because the number of possible inputs to an oracle can be extremely large (e.g., $2^{256}$ for an oracle constructed from a 256-bit block cipher), it is not feasible for an attacker to anticipate or pre-compute the responses to random queries.

Interpreters, emulators, and virtual machines: A variety of interpreted computer languages are known in the background. Some interpreted languages, such as Java, require a compilation process to convert source code into an executable or interpretable form. In contrast, most BASIC interpreters operate directly on the source code. Some interpreters allow self-modifying code, while others do not. Technology for implementing interpreters and for emulating assembly languages is also known in the background art. For example, sophisticated emulators such as Virtual PC and SoftWindows can run programs designed for Microsoft Windows on Apple Mac computers. Virtual machine (VM) designs, such as those used for Java and JavaCard, are known, and it is also known that VMs can interact with native code on the computer, or call other VM functions in different memory spaces. (Many Java implementations provide these capabilities.) Interpreted languages are commonly used for applications or where cross-platform compatibility is required, such as for creating processor-independent device driver formats. (See, for example, *Writing FCode 2.x Programs*, Sun Microsystems, 1993, page 5.)

Key management: A wide variety of methods for assigning and managing cryptographic keys have been proposed. It is known that devices can have device-specific keys, group keys, public keys, private keys, certificates, etc. Keys can be assigned to individual devices, to selected groups of devices (e.g. as described in U.S. Pat. No. 5,592,552 to Fiat), to all devices, etc. Devices can contain a variety of keys of different types, including symmetric keys, public keys (e.g., to verify certificates and digital signatures) and asymmetric private keys.

Media: Media technologies are known that can offer tremendous storage capacity, low manufacturing cost, and good durability. Examples of current media technologies include optical discs (CD, DVD, etc.), magnetic media, flash memory, and ROMs. Newer technologies, such as holographic memories, are also being developed. It is known that a single piece of media can include data of many different types. For example, a compact disc can contain standard Red Book audio tracks as well as a data session for use on personal computers (e.g., containing software, compressed bonus tracks, images, videos, lyrics, etc.) Compact discs for use for use in personal computers can contain both encrypted content as well as the playback software required to play the content.

Network communication: Sophisticated data networks, including the Internet, are known. These networks can provide flexible, reliable, high-bandwidth data communication. Although networks with a physical connection usually provide higher bandwidth, wireless communication channels are also popular.

Renewable security: In some cases, it is not practical to produce a security system that is guaranteed to be able to prevent all possible attacks. As a result, it is desirable that it be possible to renew security after an attack, e.g. by discontinuing the use of any compromised keys and correcting the vulnerability. Although renewable security is desirable, many deployed and proposed systems lack any effective recovery mechanism for many kinds of attacks.

Sandboxing: Sandboxing involves executing software programs in a controlled environment where the program is unable to access any operations that could damage the system. The Java "virtual machine" supports sandboxing so that untrusted applets (such as those downloaded over the Internet) can be executed.

Security modules: Many security systems employ removable security modules so that the security upgrades can be performed without the difficulty or expense of replacing other portions of the system. For example, removable security modules are used in many pay television systems.

Software updates: Secure software updates can be performed by receiving a proposed software update, verifying a digital signature or message authentication code validating the update, then (if the signature is valid) performing the update. For example, it is known that digital audio players can receive code updates, verify digital signatures or message authentication codes on the updates, and (if valid) update their code. Methods for ensuring that updates are applied in the correct order (e.g., using sequence counters) and for recovering from failed or unsuccessful updates (e.g., by reverting to previous software versions or by activating special recovery code) are also known. It is also known that software updates can be delivered via virtually a wide variety of distribution mechanisms, such as the Internet, optical media, ROM cartridges, etc. Software updates have been used to prevent pay television piracy by distributing code updates with the signal to descramblers, which apply and successfully execute the new code to compute the correct decryption key for the next video segment. These updates are commonly used to prevent unauthorized viewing by disabling or even destroying unauthorized descramblers.

Steganography: Steganography involves hiding information in data. For example, it is known that encrypted data can be placed in the least-significant bits of an image or sound recording. An attacker who obtains this image or recording but does not know the decryption key cannot even determine whether there is any hidden data because low-order bits often appear random and ciphertext produced by a strong encryption algorithm cannot be distinguished from random data without the key.

Tamper resistance: Many methods are known for designing and constructing devices that are resistant to attack. Tamper resistant hardware is commonly used in systems where it is desirable to prevent attackers from reverse engineering devices or extracting keys from cryptographic modules. For example, Wave Systems markets a tamper-resistant microprocessor-based integrated circuit product called "Embassy" which can be integrated with content players or general-purpose computers and is advertised for use in securing the distribution of digital content. Methods for implementing tamper resistant software have also been proposed (see, for example, U.S. Pat. No. 5,892,899 to Aucsmith et al.).

Traitor Tracing: Traitor tracing schemes have been proposed to identify the source of compromises or attacks, typically by tracing keys used in unauthorized devices back to a customer particular or compromised device.

Watermarking: Watermarks are signals embedded in content that can be detected by a specialized detector but do not affect (or minimally affect) human perception of the content when played. Watermarks embedded in pictures, sound recordings, and images have been used by copyright holders to indicate that copying is not authorized. "Robust" watermarks are known that can withstand conversions between formats (including re-recording from analog outputs) and provide varying degrees of security against attacks attempting to remove the watermark. In contrast, "fragile" watermarks have little or no ability to withstand format conversions but are easier to design and can carry more information.

Although no anti-piracy system can completely prevent all possible attacks, systems of the background art fail to provide practical solutions to solvable problems such as casual piracy using digital-to-digital copying or high-speed ripping of protected formats to unprotected formats. Significant limitations of many systems of the background art include, without limitation:

Reliance on global secrets: Many protection systems require that cryptographic algorithms, keys, and other information needed for decoding be kept secret. As a result, the decoding process cannot be documented in open standards documents without compromising the security of the system. Also, if a large number of implementations are available, attackers can potentially break the entire scheme by attacking the weakest implementation. (Such an attack recently occurred with the DVD video protection system.) While such systems are useful in closed single-vendor environments, they cannot be standardized and do not provide effective long-term security.

Lack of standardization: Content publishers have already committed to a variety of data formats and decryption algorithms that are incompatible. Different content protection systems enable different business models, and publishers who have committed to one model are likely to oppose any security system that requires a different model.

Incompatibility with product types: Many security features cannot be integrated with all product types. For example, downloadable software-only players for personal computers cannot include tamper-resistant hardware. Similarly, frequent software updates are difficult to deliver to players lacking Internet connectivity.

User interface: Many proposals involve complex user interfaces. Security should be invisible to honest users. Users are likely to reject schemes that require explicit user involvement (e.g., to obtain or enter authorization codes). In general, consumer electronics devices such as car stereos and video disc players must be easy-to-use, since many users must be satisfied even if they do not read documentation, are intimidated by technology, have poor eyesight or other handicaps, or lack fluency in the languages supported by the player.

Legal challenges: Some security systems require cooperation between competitors. Such cooperation can be illegal due to antitrust regulations.

Lack of manufacturer benefit: Manufacturers will oppose security features that increase player cost, time-to-market, prevent the inclusion of legitimate features, or otherwise make their products less effective or desirable. Although advances in semiconductor technology are decreasing the cost required to implement security systems, effective tamper-resistant hardware remains difficult and expensive to design and produce. As a result, content protection systems that rely on manufacturers to produce good implementations will fail unless they provide a real marketplace advantage to manufacturers whose offerings are more secure.

Indefinite security policies: Effective security systems must specify rules or other decision-making procedures for determining whether to allow or prevent user-requested specific actions. In many systems, these rules or procedures are not well specified.

Inflexible security policies: It is desirable for content protection systems to have the flexibility to support different models for different publishers, content types, jurisdictions, playback environments, etc. Systems should offer the necessary flexibility without becoming too complex.

Weak long-term security: Security systems must be robust and flexible enough to remain effective for a long time. Few content protection systems of the background art could last more than a few years as part of a high-profile format, while a popular format can last for more than 30 years.

Untraceability of attacks: If attacks do occur, systems should be able to identify the source of the attack so that the compromised (or misused) device can be revoked and so that criminals can be prosecuted.

SUMMARY

The present application relates to various embodiments, and aspects, of a standardizable content protection system that can be implemented in a manner providing flexible and renewable content protection across a wide variety of interoperable platforms. The system provides participants (manufacturers, publishers, artists, and/or consumers, etc.) with unparalleled flexibility to make decisions about security and functionality.

An exemplary player usable with the system (i.e., a device that wishes to decrypt or otherwise gain access to protected content) includes several components. The first is a data or media input interface, such as for an optical disc drive. To initiate playback, the player loads a sequence of data processing commands from the input interface and begins executing these commands using an interpreter or other execution module. This execution environment preferably provides a Turing-complete language (one that can execute any algorithm, subject to the player's memory, user interface, and performance limitations). From the execution environment, the content can query the player to determine the configuration of the playback environment and to perform cryptographic operations using the player's keys. Content can thus be designed so that playback will only proceed on players that provide satisfactory responses to queries. Publishers can also provide limited playback. For example, less secure platforms could provide CD-quality stereo audio or regular-definition images, while more secure platforms could offer more audio channels, high-definition images, higher sampling rates, and higher-quality compression. Even after playback begins, playback can remain under the control of the content's data processing commands. One exemplary embodiment includes the capability to perform robust, essentially on-the-fly watermarking. Enabling the content itself to control what data regions are played, makes it possible to embed information in the output by selecting between output data versions with tiny differences. Pirate copies can be traced back to a specific player by analyzing these differences.

Because the content contains and enforces its own security policies, attacks that occur can be addressed by designing and issuing new content that is resistant. The flexibility afforded by allowing content to enforce its own security policies also allows support for artists' preferences, regional "fair use" regulations, etc. New player features can be added easily by adding new content-accessible player functions.

From a business perspective, it is desirable that any content protection system be usable to unite content publishers and consumer electronics manufacturers in the common goal of providing the best possible security consistent with their business and operational constraints. The systems disclosed herein allow publishers to determine their own security requirements then allow the content itself to implement policies that consider a wide variety of factors and determine whether (or how) to play in each environment. Also, manufacturers can be motivated to design products that offer good security and do not facilitate piracy so that their customers will have the broadest-possible access to content.

DETAILED DESCRIPTION

Figure 1:
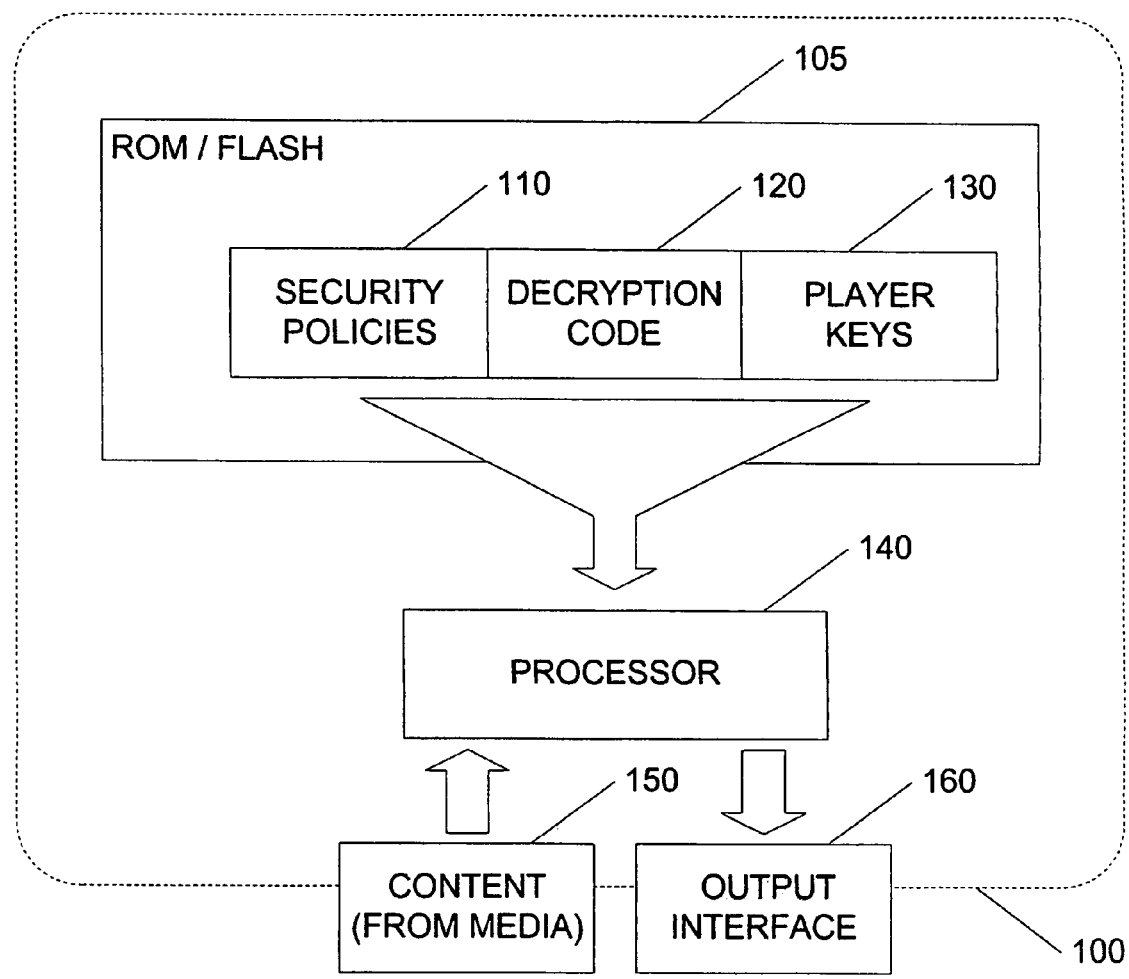
FIG. 1 shows a media player using content protection methods of the background art.
Figure 2:
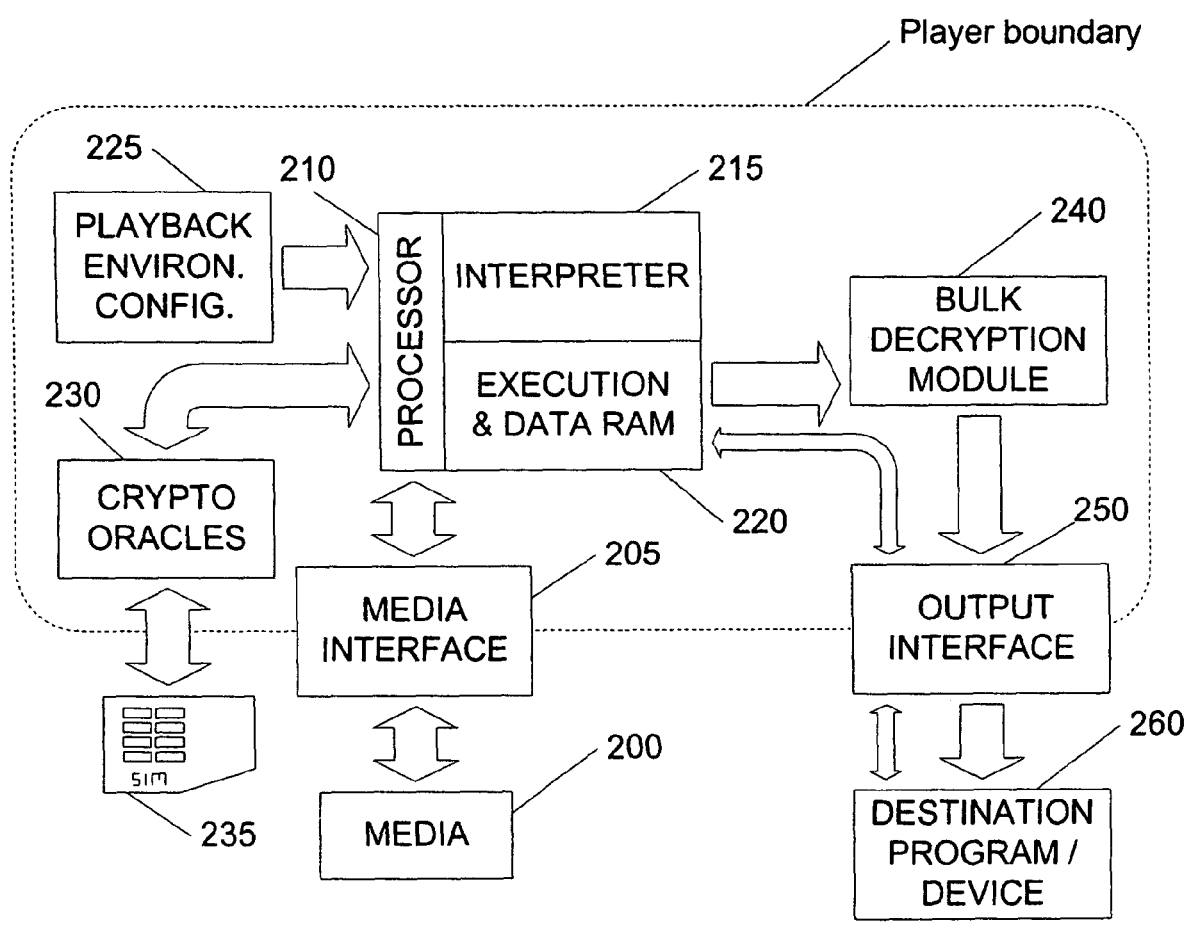
FIG. 2 illustrates an exemplary media player using content protection methods disclosed herein.
Figure 3:
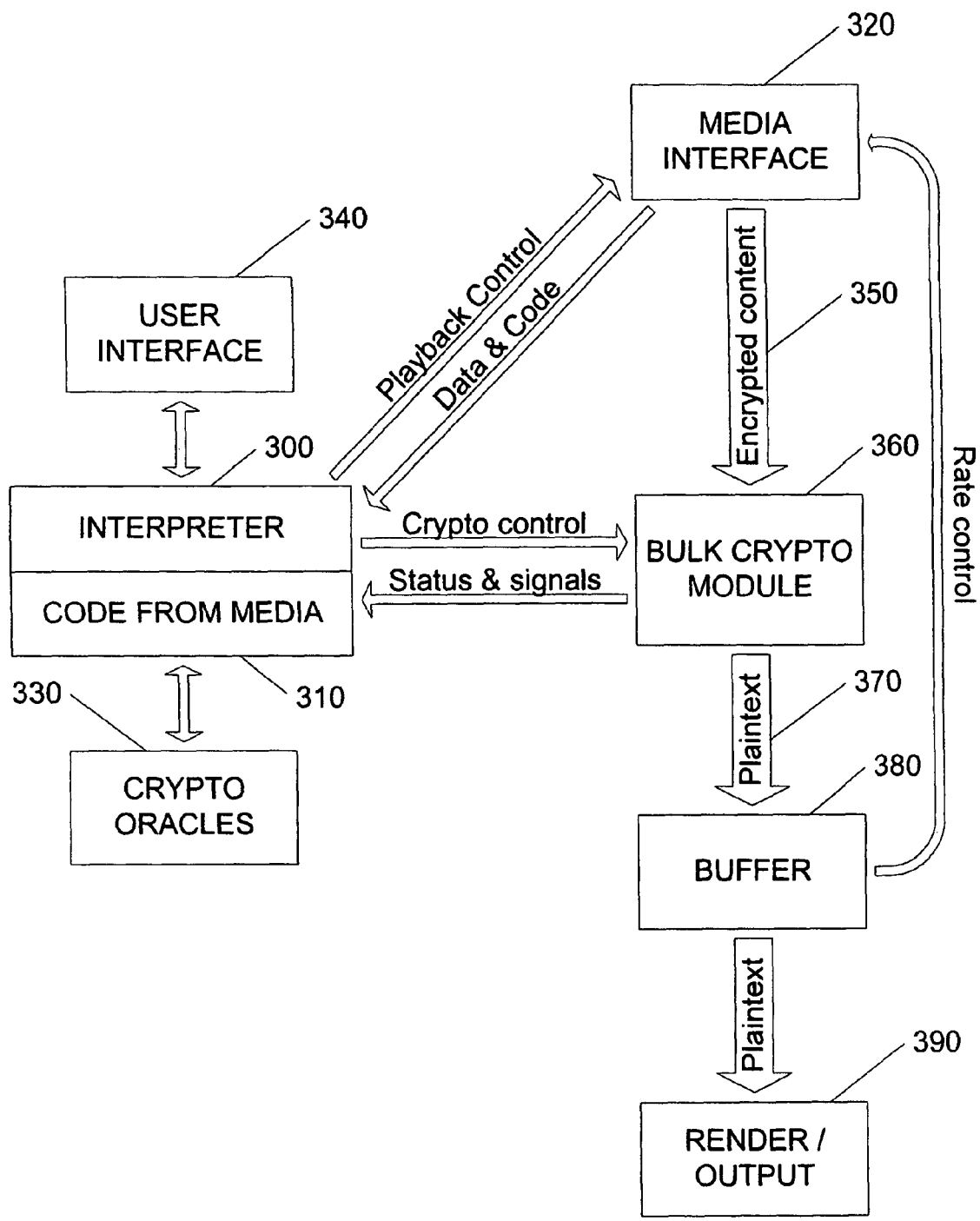
FIG. 3 illustrates the decryption portion of an exemplary embodiment.

FIG. 2 shows an exemplary embodiment of a player using physical media 200. The playback process is controlled by processor 210, which can access media 200 via media interface 205. When media 200 is mounted (e.g., when it is first inserted, or the system is re-initialized, etc.), processor 210 begins by initializing the media interface, reading the media's table of contents, and recognizing the protection system supported. If so, the processor loads a small initial portion of media 200 into execution and data RAM 220.

Using interpreter 215, processor 210 begins performing the data processing operations specified by the loaded media portion. Interpreter 215 provides a set of predetermined data processing operations from which more complex tasks can be accomplished. The interpreted language is preferably Turing-Complete. Turing-Complete programming languages are characterized in that algorithms implementable in one such language can be implemented in any other, and the implementations will have similar asymptotic performance characteristics. Examples of Turing Complete programming languages include without limitation C, C++, BASIC, Fortran, Pascal, Java, and virtually all assembly languages.

The loaded portion proceeds by invoking procedure calls provided by interpreter 215. Although the initial data loaded into RAM 220 may be relatively small, code running on interpreter 215 can load additional data (including code) from the media via procedure calls, thereby allowing more complex operations to be performed.

Other procedure calls allow the content to determine the playback environment configuration 225. The content can thus analyze the playback environment characteristics (e.g., player type, requested user action, etc.) to determine if playback should proceed. In an exemplary embodiment, if correctable problems are detected (e.g., if the media contains a security firmware upgrade for the player), these can be addressed. If supported, the content can also query output interface 250 and, if supported, destination program/device 260 (e.g., amplifier, digital speakers, speaker driver, etc.) to check security characteristics, load cryptographic keys, specify output parameters (e.g., to specify reduced output quality if security is uncertain), etc.

In an exemplary embodiment, the content can also query cryptographic oracles 230, which may be implemented in an external removable security module 235 (such as a smart card, etc.) to allow for security hardware upgrades. Oracles can also be implemented, without limitation, in processor 210, other hardware in the player, in media, in attached devices such as speakers, etc. Cryptographic oracles 230 can provide the content with verifiable proof of the player's identity. Results from queries to oracles 230 can be used in decrypting subsequent content or code portions, thereby providing strong cryptographic assurance that players lacking valid keys (or whose keys are revoked) cannot decrypt the content.

In an exemplary embodiment, the interpreter executes the data processing commands specified by the content in a "sandbox," meaning that the content does not have access to cryptographic secrets (such as oracle keys) that could otherwise compromise the player. Sandboxing is useful where not all content is necessarily trustworthy. For example, an attacker could try to produce malicious content that attempted to extract the cryptographic keys from players. (Additional information about exemplary cryptographic oracles and their operation is provided below.)

If the content determines that playback should not proceed (for example if a user is attempting to make a copy and the content is configured to prohibit copying), the content can report an error and reject the requested action. Alternatively, the content can control the rendering and/or output processes to reduce the quality of the output so that unauthorized copies will be degraded and therefore less attractive.

If the content determines that playback should proceed, the content then awaits a signal from the player specifying that playback should begin from a specific location on the media (e.g., a particular track). Interpreter 215 processes the request using the data processing instructions loaded into execution/data RAM 220 when the media was mounted. If the content decides that playback should proceed, it uses procedure calls to direct media interface 205 to begin loading encrypted content from the appropriate location on media 200. The content specifies valid decryption keys and parameters to bulk decryption module 240, which retrieves the encrypted content from RAM 220 (or, alternatively, directly from media interface 205) and decrypts it. The decrypted content is then supplied to output interface 250, which converts it to the appropriate analog or digital format for destination program or device 260. As playback continues, the data processing instructions being processed by interpreter 215 can load new decryption parameters, specify new blocks of data to read from media 200, etc. When playback completes, the content can re-initialize the RAM 220.

Additional information is provided in the following sections about the interpreter, the playback system, and other embodiments and aspects.

Responding to Attacks

Anti-piracy systems implemented widely in software and in low-cost consumer electronics devices cannot prevent all possible attacks. The techniques disclosed herein are usable, following an attack, to facilitate mastering new content in ways that substantially block the existing attacks. While professional pirates may try to continuously seek out and install new circumvention systems, casual piracy will involve an ongoing struggle to develop and maintain attack tools and will hopefully therefore be more difficult than simply purchasing content legitimately. The following sections describe how the techniques described herein can be used to address some common attacks.

A first category of attack involves attempts to use uncompromised players to perform unauthorized actions. For example, content can be mastered to allow copying from original media but disallow copying from copies. If an attempt is made to copy such content from a copy (which the content could, for example, recognize by detecting modifications inserted during the copying process or by comparing the current media's serial number and/or type with the original), playback can be blocked by the interpreter code. Alternatively, the interpreter can allow content to play with reduced fidelity (such as playing stereo audio with a 44.1 kilohertz sample rate even though multi-channel audio with a higher sample rate might be available), or by inserting additional anti-piracy warnings. Thus, by analyzing information provided to the interpreter, inappropriate user requests can be detected and handled on non-compromised players.

A second category of attack involves compromise of a player's cryptographic keys. If a player's cryptographic keys have been compromised, an attacker could (at least in theory) emulate the compromised playback environment completely by emulating the cryptographic oracles and (optionally) providing false responses to queries about the playback environment. Security can be re-established after such an attack by making the interpreted code in future content require at least one cryptographic key that was not present in the compromised device. If a particular player model or manufacturer is the source of many attacks (e.g., because the player implementation has inadequate security), publishers can create content that will not play (or will play at reduced quality) on such platforms.

A third category of attack involves compromising a particular piece of content or a group of titles containing similar interpreter security code. Such attacks could potentially be mounted by modifying the content itself to bypass security checks or by producing a malicious interpreter tailored to play the target title. Such attacks can be addressed by deploying different or better protection software in future content.

A fourth category of attack involves copying content from protected media to unprotected formats, then redistributing the content in the new format. No content protection system can completely prevent such attacks, but the techniques and systems disclosed herein provide for powerful, flexible watermarking capabilities that can be used to trace a compromise back to a particular device which can then be revoked to prevent future attacks. Because the number of users who actively upload content for piracy is relatively small, piracy can be reduced significantly by identifying and revoking these users' players. Imperceptible differences can be introduced in the decryption output by selectively skipping portions of the ciphertext. For example, in an exemplary embodiment, the content can watermark a "zero" bit by directing the player's decryption module to decrypt and output a first ciphertext portion then skip a second ciphertext portion. To watermark a "one" bit, the content can direct the module to skip the first ciphertext portion and output the second one. By encoding a series of such bits, the content can be watermarked with any data available to the interpreter code, including without limitation the identity of the player, results of cryptographic operations, user action descriptions, output device information, etc. If a pirated copy of the content is discovered, the watermarks can be analyzed to trace the illegal copy back to a single player, which can then be revoked in future content releases. This capability is also useful for law enforcement and forensic purposes, since it is possible to prove with certainty that a particular copy originated from a particular player. Features for tracing copies can also serve as a disincentive to piracy since people considering making illegal copies will be discouraged by the knowledge that they could be identified, caught, and prosecuted.

Of course, no consumer-friendly anti-piracy system can reliably prevent all possible attacks in all environments. For example, audio and video can be recorded from analog outputs. (Even if watermarks are embedded in content, recorders without watermark detectors are available.) Data captured from analog outputs can then be re-mastered onto new digital or analog media and redistributed without the original's security features. Similarly, copies made by professional pirates who have equipment required to make exact copies of media cannot be detected by the player, but the techniques and systems disclosed herein can help to prevent media cloning. For example, disc manufacturer identifiers on media can be checked by content to ensure that honest or careless duplicating facilities will not be duped by pirates. Media type identifiers can prevent content sold on read-only media from being redistributed on recordable media. For players with Internet, telephone/modem, or other network support, content can (for example) obtain authentication from a server prior to playback (or the first playback) to validate that the media is valid. Players with nonvolatile storage can even store a table of known-bad media serial numbers, which the content and/or player can query to determine whether the media has been revoked.

Querying and Controlling the Playback Environment

The content can be configured to decide whether it will allow itself to be decoded. To assist with this decision, the player can provide the content with information about the playback environment. Although very limited information (such as the user's requested action and the player model) may be adequate in many cases, more detailed and accurate information is desirable so that the content can make a more informed assessment as to whether playback should proceed. Although the specific information and capabilities provided to the content depend on the player implementation, the following describes (without limitation) some exemplary functions and capabilities that can be provided to content. Note that for players constructed out of multiple connected components (such as output ports, connected output devices, operating system device drivers, security modules, etc.), some or all of the following information may be provided for these connected devices as well as the main part of the player containing the interpreter.

Security Support Information: Security specification version, supported query functions, and/or security module form factor (replaceable hardware, embedded hardware, updateable firmware, ROM firmware, PC software, etc.), etc. (Exemplary cryptographic processing functions and playback control/decryption functions are discussed in detail below.)

Manufacturer Information: Name, identifier, web site, public key/certificate, manufacturing batch, manufacture date/time, region of manufacture, country of manufacture, manufacturer address, technical support contact information, and/or manufacturer warranty information, etc.

Device Information: Product line, serial number, model number, firmware/software versions, device public key/certificate identifiers, GPS location or other physical location/region, content supported Codec types, network/Internet support information, network addresses, device telephone number, IP address, watermark support, interpreter performance ratings, security certification ratings, device distributor(s), device retailer, device form factor, and/or security specifications, etc.

User Information: User name, geographical region, country, address, GPS location or other physical location/region/country/etc., user telephone number, IP address, e-mail address, web address, preferred language, tolerances for controversial material, preferred payment methods/accounts, payment limits, purchase history, and/or privacy preferences, etc.

Media Control: Query media format, recordable vs. non-recordable, media serial number, recording device type, recording device owner, recording device serial number, recording device security information, and/or recording device watermark-checking capabilities, etc. Functions can also allow reading from media, writing to media, formatting media, testing media, and/or ejecting media, etc. Additional functions can provide access to cryptographic functions or other special capabilities supported by particular media formats.

Requested User Operation: For example, play, record, translate to new format, load to portable device, make first copy, make multiple copies, and/or simultaneous play/record, etc. The content can also be given the ability to initiate or modify requested operations.

Output Information: Information about output ports, output port configurations, output port security characteristics, connected devices, output data format, and/or output data quality/resolution, etc. If supported, content can directly query output devices, to obtain additional information about the device, and/or request cryptographic operations, etc. The player can also allow the content to modify these parameters, for example to specify reduced-quality output if security is poor.

Environment: Identities/hashes/versions of other running programs and device drivers on the platform; contents or hashes of memory; versions of installed attack detection modules; results of system scans for attacks, and/or status of tamper detectors, etc. These functions can also allow the content to modify memory, e.g. to correct security weaknesses in other programs.

Time: Date, time, time zone, elapsed clock cycle count, time since last reset, time since manufacture, time since last security upgrade, time since last battery change, and/or estimated battery life remaining, etc.

Connectivity: Determine player communication capabilities, check current connection status, establish network connections, establish modem connections, specify criticality of establishing network connections, check/specify connection security characteristics, transmit data, receive data, close connections, and/or idle connections, etc.

User Interface: Display user messages, display lyrics, display graphics images, print graphics images, display advertising/promotional messages, identify available user interface controls, obtain user input, play speech to the user using a player's speech synthesizer, and/or error reporting, etc.

Watermark Control: Select content regions to output, select external watermarking algorithms, control external watermark detectors, and/or check mark detector status, etc.

Other: Player/playback status information, pay-per-play billing control (e.g., player-based funding sources), error handling, playback termination, secure nonvolatile memory support (see below), apply player firmware update, and/or invoke external modules (such as dynamically linked libraries), etc.

Some standardization of functions and parameters is useful to ensure interoperability between implementations (e.g., so that content can function effectively in player environments designed after the content was originally published) and to simplify the task of authoring secure content. Standardization is particularly helpful for functions where a variety of different manufacturers' products should provide the same types of information or operations. For example, a function and response codes to allow the content to determine the player form factor (home audio/video, portable, automotive, personal computer software-only, personal computer software with hardware assistance, professional studio, movie theater, etc.) can be standardized. Standardization has the additional benefit of preventing manufacturers from trying to avoid security controls by reporting pertinent risk-related information in nonstandard formats that pre-existing content cannot understand.

Of course, the system may also be configured to allow for manufacturers to add additional proprietary functions for use by content producers who choose to use them. The ability to add new functions is particularly valuable for manufacturers who wish to add new features to their products, since they can add these features, then establish co-operative business relationships with content publishers to support the features. Such an embodiment can be extended easily while (if desired) maintaining backward compatibility.

Manufacturers are responsible for providing accurate information to the content. While the content generally cannot directly verify the accuracy of much of the information it receives, this is not strictly necessary where manufacturers have strong incentives to ensure that this information is correct. For example, publishers could prevent their future content from playing on products made by dishonest manufacturers.

Although it can be beneficial if players provide cryptographic authentication of information they provide to the content (e.g., by including digital signatures issued using certified player or manufacturer keys), such authentication is not mandatory for most data. For output devices (such as digital speakers requesting high-quality digital audio data) or other portions of the system that connect via potentially untrusted interfaces, cryptographic authentication is more important so that malicious devices that impersonate trustworthy devices can be detected and avoided.

Cryptographic Processing

In addition to providing information describing the playback environment, an exemplary player also implements cryptographic operations that can be invoked by the content. These operations can behave like cryptographic oracles, allowing the content to supply an input datum (for example, a 64-bit plaintext block) and returning the result of a cryptographic computation. In an exemplary embodiment, the inputs to the cryptographic computation include at least a key (whose value is normally unknown and inaccessible to the content) and the content-specified input datum.

The following are (without limitation) examples of cryptographic primitives that can be provided to the content for uses including (without limitation) authenticating the playback environment, deriving content decryption keys, etc.:

Block cipher oracles: The oracle encrypts (or decrypts) an input message using a secret key, producing a ciphertext (or plaintext) result.

Hash function oracles: The input message is hashed, typically with a secret key (for example using an algorithm such as HMAC-SHA), to produce the result.

Digital signature oracles: The input message is digitally signed using the secret (private) key to produce the result. The function can also provide the public key and its certificate(s) to the content.

Random number generators: Random number generators can provide the content with unpredictable information, for example to use in preventing replay attacks in on-line connections.

Mathematical functions: Basic mathematical operations can be provided to help the content optimize its computation processes. For example, optimized modular multiplication or exponentiation functions can be used by the content to perform the RSA algorithm of U.S. Pat. No. 4,405,829 to Rivest et al. to produce and verify digital signatures and to encrypt and decrypt messages.

Optimized cryptographic primitives: Optimized implementations of standard cryptographic algorithms can help improve performance. These operations can be used to help decrypt or hash blocks of data, including without limitation regions of the interpreter code space or sectors of content loaded from media.

Decryption control: If the content decides that playback is authorized, the interpreter code can initialize the content decryption module with the correct decryption key for each segment of content. In addition, the interpreter code can specify portions of the content that should be rendered or skipped (e.g., to allow real-time watermark insertion during playback). To ensure synchronization between the interpreter and content streaming from media, key changes (or skipped regions) can be specified in advance then triggered by signals in the content. For example, an exemplary embodiment could allow the content to specify a 64-bit value that triggers a key change when encountered in the ciphertext, the number of ciphertext bytes to skip following a key change, and the new key value to use.

Key management: These functions allow the content to determine which keys are known to the player.

In an exemplary embodiment for cryptographic oracles whose operations do not incorporate random parameters or other such variable data, the system can be configured so that expected result for a particular input can be computed in advance (e.g., when the content is mastered). The publisher can thus program the content to submit a chosen input to the oracle, then verify that the expected result is obtained. Malicious players that lack authorized cryptographic keys will be unable to compute the correct oracle response. Because the number of possible oracle inputs is enormous (e.g., $2^{128}$ for an oracle using a block cipher with a block size of 128 bits), it is not practically feasible for an attacker to precompute or store the results to all possible queries.

In addition to validating valid players, cryptographic oracles can also be used to identify invalid players. For example, if keys extracted from a legitimate player are being used for unauthorized purposes, content can be mastered so that it will refuse to play on players that contain the revoked oracles. Because content will not play without valid keys, unauthorized players must include stolen keys. However, by using these stolen keys, unauthorized devices reveal their status to new content that is aware of the compromise.

A wide variety of methods can be employed for incorporating oracle results or checking whether a particular oracle query response is valid. The simplest is to simply perform a comparison against an expected value. Because this can (at least in theory) be circumvented by a maliciously-designed interpreter that behaves as though all comparisons match, content can include "dummy" comparisons that are expected to fail or other such tests designed to thwart malicious interpreters. The oracle itself can also be used to decrypt code or influence self-modifying code. For example, the input to the oracle can be an encrypted version of the desired code. Depending on their configuration, such oracles thus allow content publishers to include on media code that can only be decrypted by authorized players or a subset of players, thereby helping to keep the content's code away from potential attackers. Another way to use oracles is to use their outputs as cryptographic keys or to derive keys. These keys can then, for example, be used to decrypt code, content, other keys, or any other data. This flexible decryption capability can be used to implement a wide variety of protocols and policies in content. For example, if players have an adequate assortment of keys, content can be programmed to use schemes such as the method of Fiat and Naor (see A. Fiat and M. Naor, "Broadcast Encryption," *Advances in Cryptology*, Douglas Stinson, editor, p. 480; Springer Verlag, 1993.). Even sophisticated access control systems, such as those described in U.S. Pat. No. 5,982,891 to Ginter et al. can be implemented if desired (provided, of course, that the player provides the necessary user interface, network, data storage, and cryptographic functions).

For mastering content, publishers may benefit from having access to oracle input/output pairs. In the case where the oracle uses a private key for an asymmetric cryptosystem such as RSA, the publisher simply obtains the public key and uses it to perform the inverse of the oracle operation. For a symmetric oracle constructed using block cipher, player manufacturers can compute for publishers inverses of the symmetric oracles provided in each player. For example, if the player oracle uses a block cipher to decrypt 256-bit data blocks under a secret key, the manufacturer can provide publishers with access to the corresponding encryption function. Because access to the inverse-oracle does not allow the oracle to be compromised, manufacturers could (for example) provide the inverse-oracle computation via a publicly-accessible web server using SSL. Manufacturers could also provide publishers with outputs from randomly-selected oracle inputs. (Although manufacturers could provide publishes with actual oracle functions as implemented in players, these functions could potentially be misused to construct unauthorized players that emulate of legitimate ones.)

The specific methods used to assign keys to players and manufacturers depends on the specific embodiment and security objectives. For example, in one exemplary embodiment, players are assigned a variety of symmetric cryptographic oracle keys, including (without limitation): player symmetric keys chosen (pseudo) randomly from a larger global pool of such keys; player-specific symmetric keys generated (pseudo) randomly by the manufacturer; symmetric keys unique to the manufacturer, player model, etc.; and/or symmetric keys authenticating that the player does not have particular characteristics (e.g., was not produced by particular manufacturers). In this exemplary embodiment, the content can identify which keys are implemented in the player by calling a separate function that returns a list of the supported keys. Players can also contain asymmetric keys. For example, in the exemplary embodiment, players have a player-specific public/private keypair; a player certificate issued by the manufacturer by signing the player public key using the manufacturer's private key; a certificate issued by a root key issuing authority validating the manufacturer's public key; a public key used to validate requests to access the player's secure memory areas (see below); and/or a public key used to validate player firmware updates.

In infrastructures involving multiple player manufacturers, it may be helpful to have one or more central administrative organizations manage keys for players, manufacturers, etc. Central administrators can also be helpful for enforcing minimum security standards, ensuring that players provide accurate information to content code, reserving keys for new manufacturers (so that that their products will be able to play old content), tracking compromised keys, performing cryptographic oracle operations for content publishers, etc.

Secure Memories and Counters

The memory available to content is typically volatile, providing content with a "clean" execution environment each time it is run. For some features, however, it is useful for content to be able to store data between playings and between titles. To satisfy this need, players can provide content with secure, nonvolatile storage for maintaining state between playings. Such storage can require additional security protections to ensure that only authorized interpreted code is able to read or modify the nonvolatile memory contents. Ensuring the security of nonvolatile memory is important for publishers so that, for example, this memory can be trusted to track offline pay-per-view viewing histories for later billing. It is not adequate to simply have a key on the media for unlocking each memory slot, since this key would soon be discovered by pirates, compromising the memory slots of all players. Thus, one embodiment provides for explicit cryptographic authentication of the code that accesses these secure nonvolatile memory regions.

In this embodiment, players contain several blocks of nonvolatile memory, which are locked (i.e., read and write permissions are denied) by default. The player also contains a public key used to authenticate requests to unlock memory blocks. To gain access to this memory block, the content calls a function that takes as input a digital signature over the block of code that is authorized to access the memory. This signature is verifiable using the public key embedded in the player and specifies the memory block to unlock and the access privileges authorized (arbitrary read, arbitrary write, increment, decrement, zeroize, etc.) within each portion of the block. The interpreter verifies the digital signature and, if the signature is valid, unlocks the memory and executes the digitally-signed code. The following shows an example of this process for use in billing for off-line pay-per-use content with occasional (e.g., monthly) auditing:

(a) Publisher X negotiates with player manufacturer Y rights to control a 4-byte counter in the nonvolatile memory of manufacturer Y's players.

(b) Publisher X writes a function for the interpreter that checks the memory contents. If the value is below a spending limit, the function increments the counter. Otherwise, the function establishes an Internet connection with the publisher, transmits a payment request including the counter value, a random number, and payment information (such as a credit card number or other funding source stored in the player). If the publisher accepts payment for the past purchases indicated by the counter plus the current purchase, the publisher transmits to the player a cryptographic authorization to clear the counter, which the player verifies and (if valid) zeroes the counter. The player concludes by relocking the memory and returning a code indicating success or failure.

(c) Manufacturer Y digitally signs the memory-update code with parameters identifying Publisher X's memory regions, access privileges, etc.

(d) Publisher X produces content including the signed code and distributes it to a user.

(e) The user's player begins loading the content, which presents the user with a purchase option. If the user declines to purchase, playback does not proceed.

(f) The content calls the memory unlock function with pointers to the code written at step (b), and the digital signature produced at step (c).

(g) The memory unlock function attempts to perform the purchase as described in step (b) and reports success or failure.

(h) If the purchase was successful, the content plays for the user. Otherwise, playback terminates.

Of course, much more sophisticated purchase mechanisms can be employed using the secure counter mechanism described above. The only real limits on what can be implemented in the content come from the player's capabilities and the publisher's creativity.

Various storage technologies can be employed with the systems and techniques disclosed herein, including without limitation, flash memory, magnetic storage (e.g., hard disks), battery-backed RAM, etc. (A wide variety of methods are known in the background art for providing nonvolatile storage and for encrypting or otherwise securing such storage.) Secure storage can (without limitation) be located outside of the player, including without limitation in a removable module (such as a smart card), in attached output peripherals (such as speakers, displays, remote devices in a home network, etc.), remotely over a computer network, etc. Memory block assignment can be provided, for example, on a space-available basis, guaranteed (e.g., by slot number), or allocated/recycled based on priority. Because the clearing or freeing of memory slots could result in the loss of unreported pay-per-view records, content can be given the ability to specify the conditions under which slots can be over-written. For players that can play multiple titles simultaneously but that have only one set nonvolatile memory slots, a locking mechanism may be required to ensure that one piece of content will access a slot that is being modified by another piece of content.

In one embodiment, a pre-paid smart card is purchased by a consumer and inserted into a slot on the player. The card contains a plurality of write-once memory slots into which the player can write identifiers corresponding to pay-per-view content titles. Once written, the content identifiers are incorporated into cryptographic oracle computations implemented in the card. Thus, content can verify that a purchase has been consummated by verifying that the correct oracle is present before allowing playback.

Note that the general approach described above for authenticating calls to player functions is not limited to use with secure counters. For example, the same approach can be used to secure access to special player features only available to authorized publishers. The approach also has applicability separate from other aspects of the techniques and systems disclosed herein, as it provides a general-purpose but extremely flexible method for securing access to computation functions.

Cryptographic vs. Language Based Security Features

Security policies can be enforced in several different ways. Cryptographic protections allow the construction of content such that revoked or unauthorized players will lack the cryptographic keys necessary to decrypt the content. Unauthorized players cannot access content which they lack keys (provided, of course, that good ciphers are used). This approach is relatively inflexible since it provides the content owner with only the ability to block playback on a particular device. (While a more sophisticated embodiment could use different key sets to offer somewhat more detailed control, key-based controls lack the flexibility required to solve more complex access control challenges.) Nevertheless, it is extremely effective at addressing the case where a particular player is compromised or otherwise deemed untrustworthy to have the ability to decrypt the content.

In contrast, language-based controls are less effective in the case where a player is compromised (or totally untrusted for some other reason), but can enforce extremely sophisticated security policies. As noted previously, the content can analyze the playback environment and call to cryptographic oracles and, if the results are deemed unsatisfactory, refuse to play. This approach provides virtually unlimited flexibility, making it ideally suited to managing risks involved in playback on players that generally behave honestly but may support operations (such as ripping to unprotected formats) that some publishers may wish to prevent on certain content. Although attackers could, at least in theory, analyze and break individual pieces of content (particularly if the content's code is poorly-written), these attacks cannot be generalized and can be reliably addressed through careful use of the cryptographic oracles. Furthermore, the decryption control capabilities described herein enable publishers who observe pirated copies of their content to identify the compromised device and produce new content that it is not vulnerable.

Evolution

It is desirable to provide content owners with a distribution infrastructure that remains secure over the long term. Previous content protection systems have failed terribly in this regard; while implementers may initially be diligent about security as they woo content owners to a new format, security levels tend to fall significantly once a format's success is ensured. A variety of factors contribute to this decline, including: availability of more implementations to attack (increasing the likelihood that an easily-broken product will be sold), increased demand for piracy as more protected content becomes available, and increased sophistication of attackers. Exemplary embodiments of the systems and techniques disclosed herein can be configured to allow content owners to continue to specify how their content will be protected even after a media format has been standardized, while allowing virtually unlimited renewability so that security is not lost forever if an attack is found.

If security policies are not static, manufacturers have an ongoing long-term incentive to provide effective security. For example, content owners can have the ability to block playback (or prevent high-quality playback) on devices whose keys are compromised or on products that are commonly used for piracy. As a result, unlike traditional systems, product manufacturers cannot sacrifice security as they compete to offer their products at the lowest possible price, since consumers will also seek out products that have robust security because these will offer the best and most reliable playback experience.

Even a well-intentioned manufacturer may accidentally produce a product that is later found to have security flaws. Accordingly, we disclose a variety of methods that can be used to respond to compromises and security weaknesses. For example, player cryptographic keys and software can be updated using digitally-signed code or key updates. These updates can be delivered to the player on media containing software that performs the key update. For example, if a legitimate user's player ends up being revoked because a previous owner compromised its security, the new owner can call the product's technical support line and obtain new keys. (Of course, the customer service personnel may wish to obtain some user information such as name, address, credit card number, telephone number, e-mail address, IP address, etc. to discourage pirates from calling to request new keys for unauthorized purposes.) Updates can also be distributed via the Internet (or other network connections), modem calls, entry via the remote control or keyboard, etc. Of course, updates should be cryptographically secured whenever possible so that attackers cannot use the update process to inject compromised keys or otherwise attack a player.

Another way that manufacturers can reduce the consequences of a compromise is to include a removable security module, such as a smart card. The smart card would implement some or all of the cryptographic oracles as well as other security-related functions provided to the content. If a compromise does occur or if a security flaws is found, it is possible to replace the smart card instead of replacing or upgrading the entire player. Note that it may be sufficient to simply provide a smart card slot, but not deploy smart cards until such time as it becomes necessary for security reasons. To prevent smart cards from being removed from legitimate players and used in malicious ones, the smart card can be cryptographically linked to the receiver (e.g., by having them share a symmetric key) before the player and/or card are sent to the consumer.

Mastering & DRMs

Any new costs involved in mastering content are a legitimate concern for content owners. The techniques and systems disclosed herein can be deployed so as to avoid significant new costs to the mastering process, if simple security measures are employed. While developing content that enforces complex security policies obviously requires more development and testing effort, this expenditure is entirely optional. (Other protection systems simply eliminate this choice, forcing all content publishers to use the same security systems, policies, etc.)

Of course, publishers do not need to develop security systems themselves since the systems and techniques disclosed herein also permit third party DRM vendors to provide security modules and mastering systems. These vendors would compete for publishers' business by offering the best features, best security, lowest cost, greatest flexibility, best ease of use, best performance, smallest code size, most extensive revocation lists, etc. The techniques and systems disclosed herein can serve as a platform where content owners have the ability to make their own decisions about security.

Watermarking & Compromise Tracing

With most conventional watermarking methods, the mark detection process is standardized and implemented in a large number of widely deployed products. This static algorithm unfortunately poses a serious risk, since knowledge of the detection algorithm generally allows attackers to remove the watermark without seriously degrading the content. In an exemplary embodiment, the systems and techniques disclosed herein may include on-the-fly watermark insertion that is not susceptible to a general mark removal attack because the mark format, encoding process, and detection process are all chosen by the publisher.

In one exemplary embodiment, a publisher (or, more precisely, a control program written by the publisher) wishes to embed some information in some output content. Each bit of this information can be encoded by decrypting and outputting either a first content portion or a second portion. These portions can be different encrypted regions on the media and can be encrypted with different keys. The differences between these portions can be chosen by the publisher when the content is mastered, and can be anything from imperceptibly-subtle variations to total dissimilarity. Because there is no predetermined relationship between the two portions, there is no way for a pirate who knows only one portion (including the decryption key for that portion) to determine the other.

Because cryptographic and program-based controls can be used to select which regions are decrypted, attackers cannot determine what the alternate region(s) contain. Indeed, content can be designed so that attackers cannot even identify whether alternate regions are present, for example by encrypting the control code (so that different players use different code) and by including dummy regions that no players or only a very small number of players can decrypt.

In one exemplary embodiment, content is authored so that only a subset of all players have the keys necessary to decrypt each version of a region of the content, yet substantially all players have the keys necessary to decrypt at least one version of the region. Thus, by analyzing an unauthorized copy of this region, the publisher can determine information about the attacker. Note that this is true even in the case where attackers manage to analyze a (vulnerable) program and decrypt more than one alternate region, since the resulting combination of several regions still reveals to the publisher which versions were decrypted. Ultimately, the only way reliable way that users can avoid revealing their identity (or their player's identity) to publishers' anti-piracy enforcement experts is to refrain from participating in piracy in the first place.

This general marking approach is different from conventional watermarking because the mark detection process need not be standardized. This difference allows vastly greater security; indeed, it can be shown that there is no general attack against this marking scheme. Furthermore, because the watermarked bits produce differences in the output, these watermarks can be extremely robust and can be designed survive digital/analog conversions, editing, format conversions, malicious attacks, etc.

The decision of how to configure and use the content marking capability is typically made by the publisher. Some artists may wish to avoid to any technology that could make any modification, however small, precluding the use of the watermarking feature on their work. In other cases, certain types of content are pirated widely and are good candidates for very aggressive use of marking capabilities. While portions would normally be chosen to have only imperceptible differences, the choice of what alternate versions to encode, how to select between possible output versions, and the management of the decryption keys for these portions is controlled by the content. Because the marking capability is controlled by data processing instructions integrated with the content, the technology can be used for other features including, without limitation, implementing a sweepstakes where winners' players output a congratulatory message, delivering of security alerts to users whose players offer inadequate security, and providing bonus content to certain users.

Of course, other watermarking schemes can also be used with the techniques and systems disclosed herein. For example, traditional watermarks (for which the mark detection algorithm is standardized) can be embedded in output as well, either by the content's code or by external watermark embedding circuitry (which may or may not be under the control of the content). Similarly, watermarks in incoming content can be sensed (again, either by the content's code or by external detectors), for example to detect attempts to make unauthorized copies or introduce unauthorized content. The choice of what watermarks to embed and how to respond to detected watermarks can be implemented in the player and/or in the content.

Example Migration Path: CD-Audio

The vast majority of digital content is distributed today in unprotected or minimally-protected formats. For example, the CD audio standards contain no anti-copying features, and the protection scheme in DVD video has been widely broken. Because legacy media players do not support adequate security, they need to be upgraded or replaced. The success of a new security system depends on establishing a critical mass of compatible players.

By combining the techniques and systems disclosed herein with existing methods for producing copy protected CDs, it is possible to produce CDs that are backward compatible. Such CDs would utilize non-standard CD formatting to produce discs that play correctly on most audio CD players but confuse computer-based ripping software. Authorized (e.g., licensed) personal computer software can also play the disc by correcting the portions that are read incorrectly or otherwise confuse the computer. Thus, playback is enabled on (most) legacy audio players because they can play the non-standard (copy protected) Red Book audio portion, and playback is enabled on personal computers that have appropriate player software (which can, for example, be included on the CD or can be downloaded over the Internet). Although long-term support for backward-compatibility with existing CD audio players can introduce additional security risks, it can be beneficial as part of a longer-term strategy to encourage the deployment of audio players that can play the new secure format so that (eventually) content can be sold in only the secure format.

Example

High-Definition DVD

The copy protection system employed by current DVD video players has been widely broken. Because millions of DVD players have already been sold and are not upgradeable to new protection systems, there is no straightforward way to upgrade the current DVD format without abandoning support for these legacy users. Fortunately, the installed base of DVD players are only designed to support "standard" definition television (e.g., 525-lines for NTSC, 625 lines for PAL, etc.), but not the much higher-quality signals provided by high-definition television (HDTV) formats. Because legacy players do not support HDTV, the new security features disclosed herein can be incorporated on DVDs that support HDTV.

In one exemplary embodiment, the player would have a user-accessible media input (consisting of a mechanized tray for one or more discs), which loads the media to a spindle where it is rotated and read using a laser. The data read from the media are brought to a microprocessor-based circuit, which analyzes the disc encoding to determine the capacity of the disc, formatting type, and security method. If the disc is a legacy (low-resolution) DVD using the legacy security scheme (CSS), then the disc is played using methods known in the background art. If the disc is a high-density DVD using programmable security methods as disclosed herein, then program code (data processing instructions) for the content's security policies are loaded from the disc and executed by the player. Players can optionally also support low-density DVDs using the improved security, as well as high-density DVDs using legacy protection methods (although using a widely-broken security scheme for new content generally provides little benefit). The quality of the output from the DVD player can be controlled by the content. For example, the content can elect to output lower-resolution output if the player and/or HDTV output device do not provide adequate security. In this case, the content can (for example and without limitation) direct the player to down-convert HDTV signals to lower resolution (for example, using a degradation module specifically designed for this purpose), supply the player with only the keys required to decrypt lower-resolution portions of the signal (and withhold keys required for the higher-resolution portions), or direct the player to output a low-resolution version of the content that is encoded on the media separately from the higher-resolution version.

Additional Considerations and Variations

In an exemplary embodiment, content can be customized for specific players. In this case, the content is playable only on a single player or small number of players, but code that is not required for playback on the recipient device(s) does not need to be transmitted. Thus, this approach is of particular value when it is difficult, expensive, or slow to send information to users, e.g. if storage space is limited or of the content must be sent over a slow network connection. The content can still, however, query the player to verify that the playback environment is suitably secure.

To ensure that playback is not interrupted or distorted, it can be helpful to require specific minimum performance standards for the players' interpreters.

In an exemplary embodiment, the systems and methods can be configured to allow content to be exchanged from one device to another. The specific security characteristics of such exchanges depend factors such as whether on-line communication with a trusted (e.g., publisher-operated) server is available. The form in which the content is transferred depends on the security policies enforced by the content and the devices' hardware capabilities. For example, in one embodiment where both devices include secure interpreters, the sending device transmits the raw encrypted content (as stored on the original media or encrypted with another key, optionally with watermarks included) along with code for controlling the playback. The playback control code can be customized by the sending device for the recipient device. In another case, the sending device may verify that the security characteristics of the output port and destination device are acceptable, negotiate a shared key with the destination device, decrypt and watermark the content, re-encrypt the content with the shared key, and send the re-encrypted content to the destination.

Players with adequate nonvolatile storage can be used to store updateable code that is called from the interpreter. For example, the player can be configured to always store the latest security code for a particular publisher. In this case, if a newer version of the security code is encountered, the old version will be updated (e.g., after verifying a digital signature on the new code). In this way, older content can benefit from security updates carried on new content. (This approach can, for example, be implemented using the secure memory method described previously.) In another embodiment, content can require that players include current security updates by obtaining the current date/time from the player and comparing against the date/time of the latest known security upgrade. In this manner, content can ensure that players have reasonably up-to-date security upgrades.

In general, content protection systems should avoid playing any visible role in legitimate actions by legitimate users. Nevertheless, some user interface elements are necessary, such as for reporting errors or providing information. In the case where content can select between multiple supported output qualities (e.g., a "legacy" quality if the player provides inadequate security and a "high" quality if security is satisfactory), an indicator can be useful to notify the user of the output quality. For example, in one embodiment, a green light emitting diode (LED) under the control of the content indicates that output is of high-quality (i.e., the security is satisfactory), an orange LED indicates reduced quality (i.e., marginal security), and a blinking red LED can indicates that no output is provided because the player is revoked. In another embodiment, a brief spoken or written notice (in the user's language, if known) is provided to report the status of the security. The decision whether to report and/or use the higher quality versus the lower quality output can be based on other factors, such as the presence and/or absence of a robust and/or fragile watermark. If necessary, a degradation module can be included with the player to enable the content to reduce the quality of playback (e.g., to the quality of a legacy format) for security or other reasons. (Degradation modules can, for example, be included to convert high-definition television signals to NTSC-resolution or to convert high-resolution multi-channel audio into 2-channel CD-quality audio.)

If the media interface and player interpreter offer adequate performance, bulk decryption and watermark embedding can be handled in the interpreter instead of in a separate decryption module. Allowing the content to decrypt itself directly can provide some security benefits, such as ensuring that attackers will not mount attacks against the decryption module. If the interpreter performance is adequate, it is also possible to implement the content decompression in the interpreter as well, avoiding the need to standardize a single player Codec type.

While implementation using an interpreter is preferable on platforms (such as personal computers) that do not have specific hardware support for the techniques and systems disclosed herein, it is possible to implement many of the interpreter functions in dedicated hardware. Depending on the application, dedicated implementations may have cost or power consumption savings, although provide reduced functionality.

Embodiments that receive content on physical media can use virtually any media format. While optical discs (such as CD and DVD) provide high storage densities at low cost, other storage systems can also be employed, including without limitation magnetic media, holographic memories, battery-backed RAM, ROM, EEPROM, and flash memory. The storage capacity of the media can be used for storing data of many different types, including information related to the techniques and systems disclosed herein (such as executable programs that implement decoding methods for various computer platforms, content protected using methods disclosed herein, etc.) as well as data that is not directly related to the techniques and systems disclosed herein (such as unrelated executable programs, unprotected content such as Red Book CD audio, content protected using other security schemes, etc.).

Media can include tamper-resistant circuitry for performing cryptographic computations to enable players to verify that the media is not an unauthorized copy. Although such capabilities are simplest to implement for media that use electrical interfaces, even optical media can include cryptographic capabilities. For example, a contactless cryptographic module (such as the contactless smart card of U.S.

Pat. No. 5,640,306 to Gaumet et al.) can be affixed to or embedded in an optical disc. While cryptographic media authentication is preferable, other authentication mechanisms can be employed instead. For example, general media authentication methods known in the background art include writing serial numbers to difficult-to-copy locations (such as regions that are not writeable using commercially recordable media or drives) and including a digitally-signed "description" of various characteristics of the original physical media. Of course, cryptographic mechanisms offer the advantage that, even if attackers discover methods for compromising existing media, future media can be issued with improved security without requiring any changes to the player.

Because many consumers already have an investment in content on legacy formats, players implementing the techniques and systems disclosed herein may be configured to support these legacy formats. Similarly, different versions of the interpreter may be supported by a particular player. In this case, the player needs to analyze the media or content to identify the appropriate security system to use. For example, a digital video player might detect whether the disc is a legacy DVD using CSS (and, if so, select a CSS decryption system) or is a DVD using the techniques and systems disclosed herein (and, if so, activate a language-based decryption system). Robust watermarks included in the content can be used to detect if content that was originally protected with one security system has been copied to a format lacking the original protections. For example, content that does not allow copying could include a watermark to indicate that any devices that encounter a copy in any other format (e.g., in an unprotected format) can recognize the copy as unauthorized and (for example) refuse playback.

The techniques and systems disclosed herein can be used with a wide variety of content types, including without limitation audio, still images, video, 3-dimensional images, and 3-dimensional video.

The techniques and systems disclosed herein can also be implemented in a variety physical devices. If only one device is responsible for decrypting content, it is preferable to have security policies enforced by that device. However, output devices and intermediate processing devices (such an audio equalizer or mixer), can also benefit from the techniques and systems disclosed herein and/or by providing query capabilities that can be used by such techniques and systems to verify their security. In one embodiment, a home entertainment server downloads, stores, and manages content, and forwards content to playback devices (speakers, headphones, video displays, etc.) whose security has been successfully verified. Connections to these devices are encrypted, preferably under the joint control of the techniques and systems disclosed herein and the destination device, to prevent theft of content in transit.

The invention claimed is:

1. A method for mastering digital content for secure playback on a player, the method comprising:
    using a processor to generate a plurality of versions of the digital content, each version of the plurality of versions being encrypted using a different encryption key;
    using a processor to generate executable instructions for execution on the player, the executable instructions being configured to:
        query a playback environment of the player to obtain player data,
        receive cryptographic data of the player,
        decode at least one version of the plurality of versions of the digital content by using the player data and the cryptographic data to generate decoded content, and
        embed a watermark into the decoded content, the watermark including at least a portion of the player data; and
    combining the plurality of versions of the digital content and the executable instructions for distribution to consumers.

2. The method of claim 1 including:
    recovering decoded content produced by a particular player; and
    analyzing the watermark in the recovered decoded content to identify the particular player used to produce the recovered decoded content.

3. The method of claim 1 wherein the player data includes information uniquely identifying a particular player.

4. The method of claim 1 wherein the executable instructions being further configured to determine if a particular player is an authorized player.

5. The method of claim 1 wherein the executable instructions being further configured to prevent playback of the decoded content on an unauthorized player.

6. The method of claim 1 wherein the cryptographic data includes at least one decryption key.

7. The method of claim 1 wherein the cryptographic data includes at least one decryption key and the executable instructions being further configured to use the decryption key to decode the at least one version of the plurality of versions of the digital content.

8. The method of claim 1 wherein the cryptographic data includes at least one decryption key, the at least one decryption key being useable for decoding only one version of the plurality of versions of the digital content.

9. The method of claim 1 wherein the cryptographic data of the player is received from a device external to the player.

10. An apparatus for mastering digital content for secure playback on a player, the apparatus comprising:
    a processor;
    a content generator executable by the processor to generate a plurality of versions of the digital content, each version of the plurality of versions being encrypted by using a different encryption key;
    an instruction generator executable by the processor to generate executable instructions for execution on the player, the executable instructions being configured to:
        query a playback environment of the player to obtain player data, receive cryptographic data of the player,
        decode at least one version of the plurality of versions of the digital content by using the player data and the cryptographic data to generate decoded content, and
        embed a watermark into the decoded content, the watermark including at least a portion of the player data; and
    a distribution content generator to combine the plurality of versions of the digital content and the executable instructions for distribution to consumers.

11. The apparatus of claim 10 being further configured to:
    recover decoded content produced by a particular player; and
    analyze the watermark in the recovered decoded content to identify the particular player used to produce the recovered decoded content.

12. The apparatus of claim 10 wherein the player data includes information uniquely identifying a particular player.

13. The apparatus of claim 10 wherein the executable instructions being further configured to determine if a particular player is an authorized player.

14. The apparatus of claim 10 wherein the executable instructions being further configured to prevent playback of the decoded content on an unauthorized player.

15. The apparatus of claim 10 wherein the cryptographic data includes at least one decryption key.

16. The apparatus of claim 10 wherein the cryptographic data includes at least one decryption key and the executable instructions being further configured to use the decryption key to decode the at least one version of the plurality of versions of the digital content.

17. The apparatus of claim 10 wherein the cryptographic data includes at least one decryption key, the at least one decryption key being useable to decode only one version of the plurality of versions of the digital content.

18. The apparatus of claim 10 wherein the cryptographic data of the player is received from a device external to the player.

19. A machine-readable storage medium embodying instructions which, when executed by a machine, cause the machine to:

generate a plurality of versions of digital content, each version of the plurality of versions being encrypted by using a different encryption key;

generate executable instructions for execution on a player, the executable instructions being configured to:

query a playback environment of the player to obtain player data, receive cryptographic data of the player, decode at least one version of the plurality of versions of the digital content by using the player data and the cryptographic data to generate decoded content, and embed a watermark into the decoded content, the watermark including at least a portion of the player data; and combine the plurality of versions of the digital content and the executable instructions for distribution to consumers.

20. The machine-readable storage medium of claim 19 being further configured to:

recover decoded content produced by a particular player; and analyze the watermark in the recovered decoded content to identify the particular player used to produce the recovered decoded content.

21. The machine-readable storage medium of claim 19 wherein the player data includes information uniquely identifying a particular player.

22. The machine-readable storage medium of claim 19 wherein the executable instructions being further configured to determine if a particular player is an authorized player.

23. The machine-readable storage medium of claim 19 wherein the cryptographic data includes at least one decryption key, the at least one decryption key being useable to decode only one version of the plurality of versions of the digital content.

* * * * *